United States Patent
Mori et al.

(10) Patent No.: US 6,221,197 B1
(45) Date of Patent: Apr. 24, 2001

(54) METHOD AND APPARATUS FOR SOLID BONDING, A CONDUCTOR BONDING METHOD, A PACKAGING METHOD, AND A BONDING AGENT AND A METHOD FOR MANUFACTURING A BONDING AGENT

(75) Inventors: Yoshiaki Mori, Nagano-ken; Yasutsugu Aoki, Kofu; Takuya Miyakawa, Suwa, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/203,464

(22) Filed: Dec. 2, 1998

(30) Foreign Application Priority Data

Dec. 15, 1997 (JP) .................................... 9-345313
Jun. 9, 1998 (JP) .................................. 10-161210

(51) Int. Cl.$^7$ ................................. C09J 5/02; B05B 3/14
(52) U.S. Cl. .................................. 156/308.6; 156/272.2; 156/272.6; 156/379.6; 427/535; 427/562; 118/723 R; 118/723 ER
(58) Field of Search .................................. 427/535, 539, 427/540, 561, 562, 569, 580; 118/723 R, 723 E, 723 ER; 156/272.2, 272.6, 310, 308.6, 99, 379.6, 390

(56) References Cited

U.S. PATENT DOCUMENTS 5,427,638 * 6/1995 Goetz et al. .......................... 156/153
5,849,368 * 12/1998 Hostettler et al. .................... 427/536

FOREIGN PATENT DOCUMENTS 1-270574   10/1989 (JP) .
10-36145    2/1998 (JP) .

* cited by examiner

Primary Examiner—Michael W. Ball
Assistant Examiner—John T. Haran

(57) ABSTRACT

A method and apparatus for solid bonding without using a bonding agent are provided. A surface of metal, glass, or other bond members 16a and 16b is fluorinated by exposure to a mixture of HF gas from a HF gas supply unit 24 and water vapor from a vapor generator 26 in a fluorination process section 12. The bond members 16a and 16b are then placed in contact at the fluorinated surface on table 36 in bonding process section 14. Argon is then introduced to bonding chamber 34. Pressure is then applied to the first bond member 16a and second bond member 16b by a cylinder 46, and heated to below the melting point by a heater 48, to bond the first and second bond members together.

32 Claims, 8 Drawing Sheets

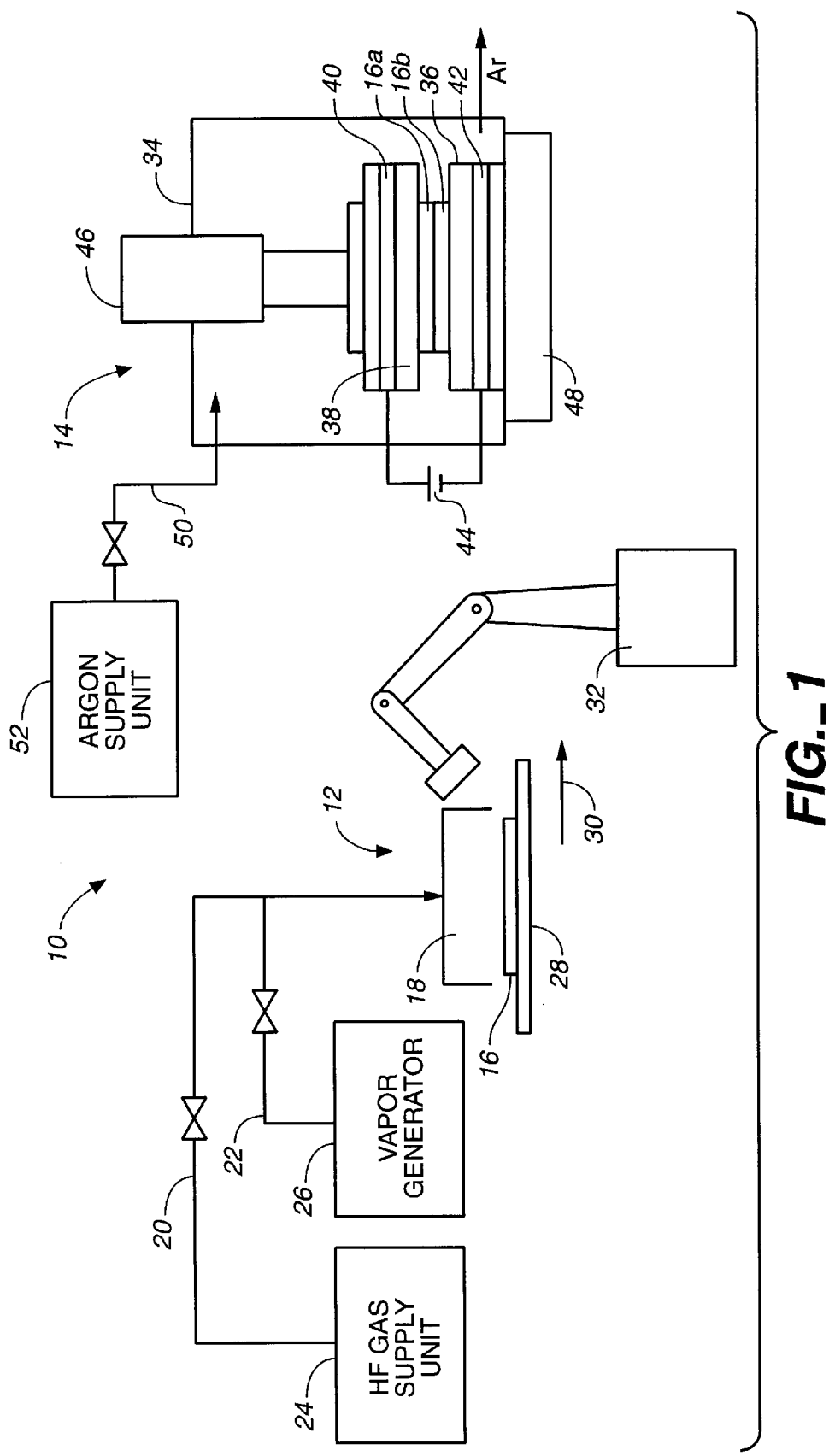
FIG._1

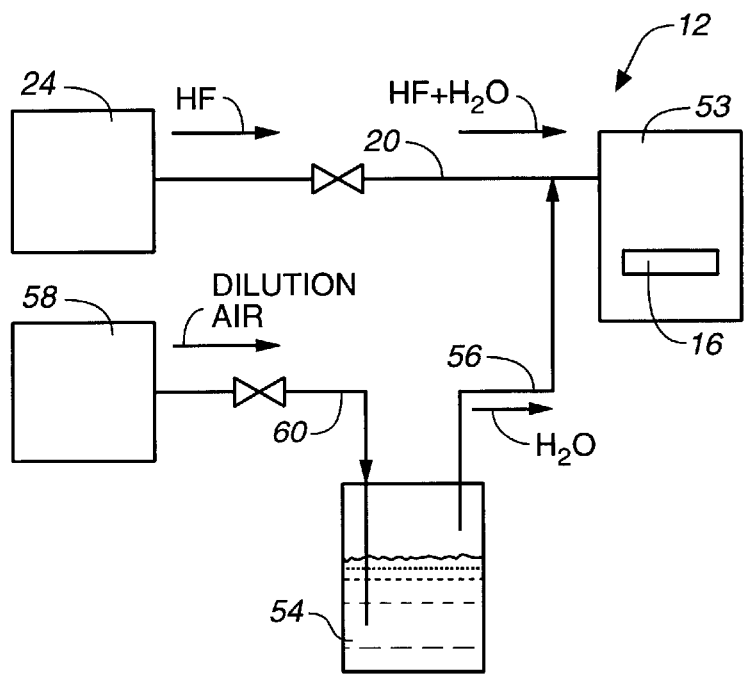
*FIG._2*
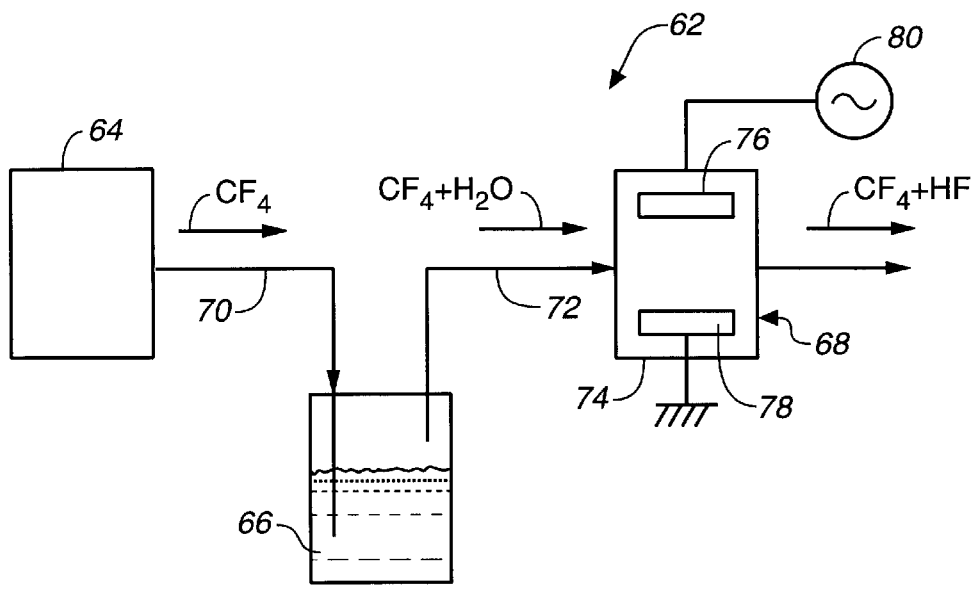
*FIG._3*

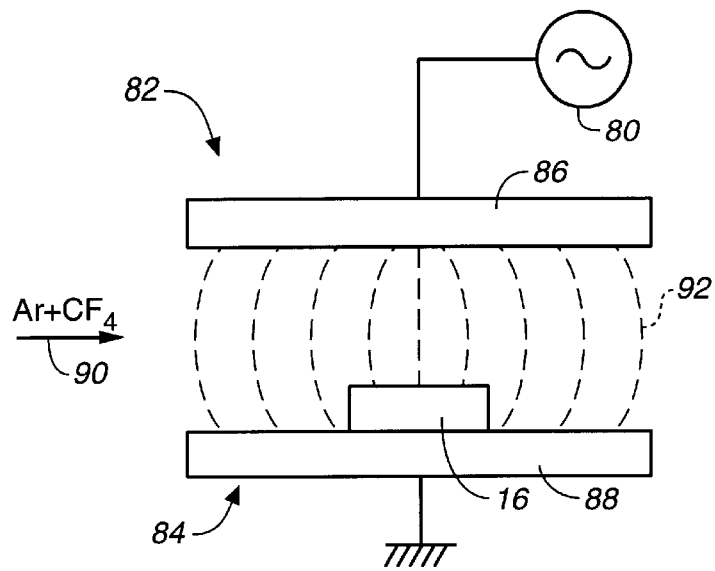
FIG._4
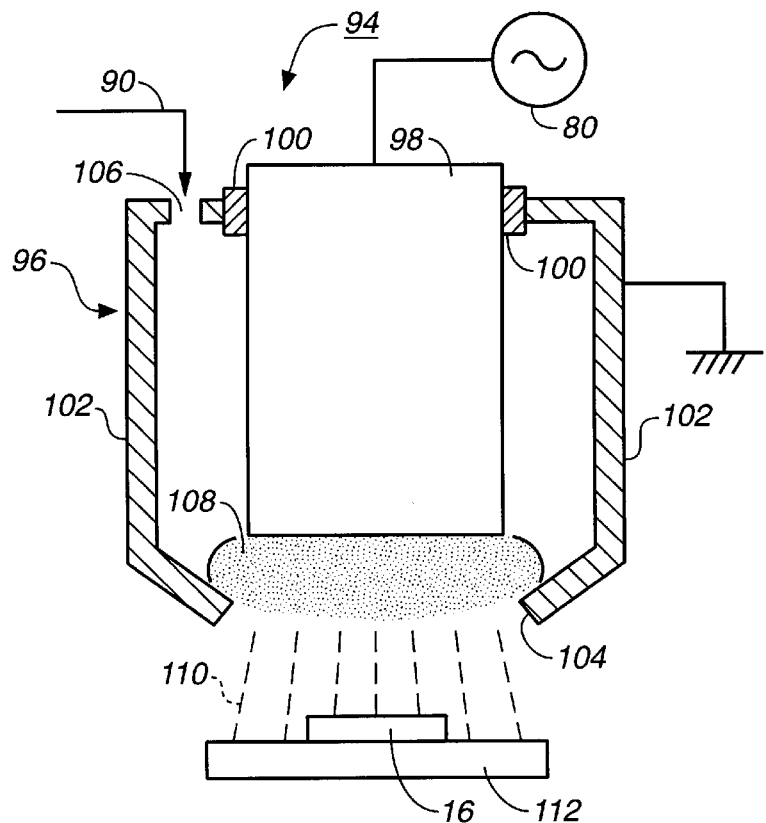
FIG._5

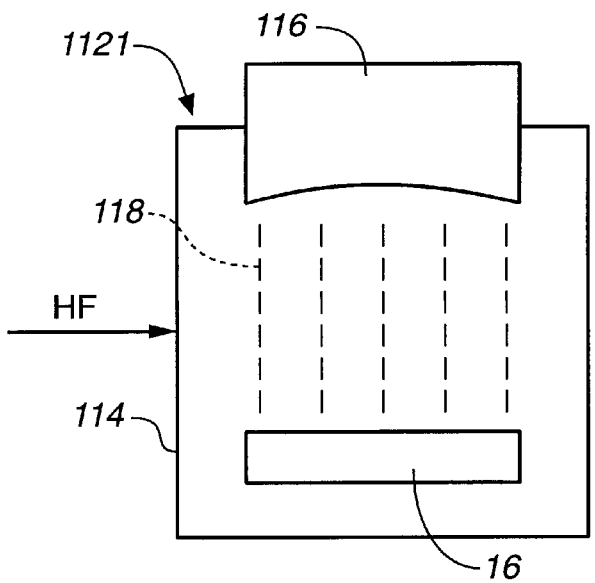
FIG._6
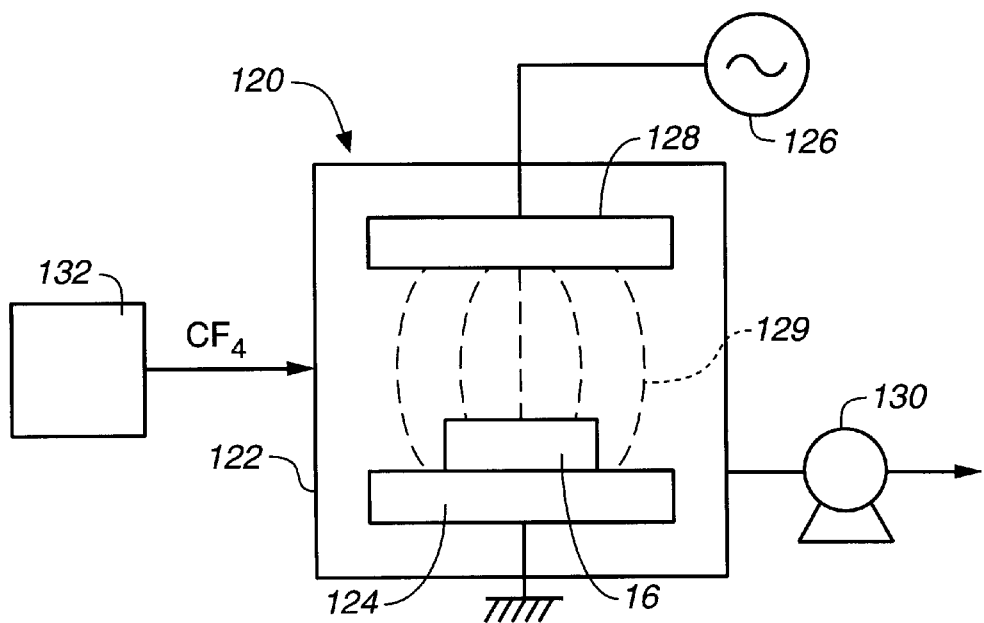
FIG._7

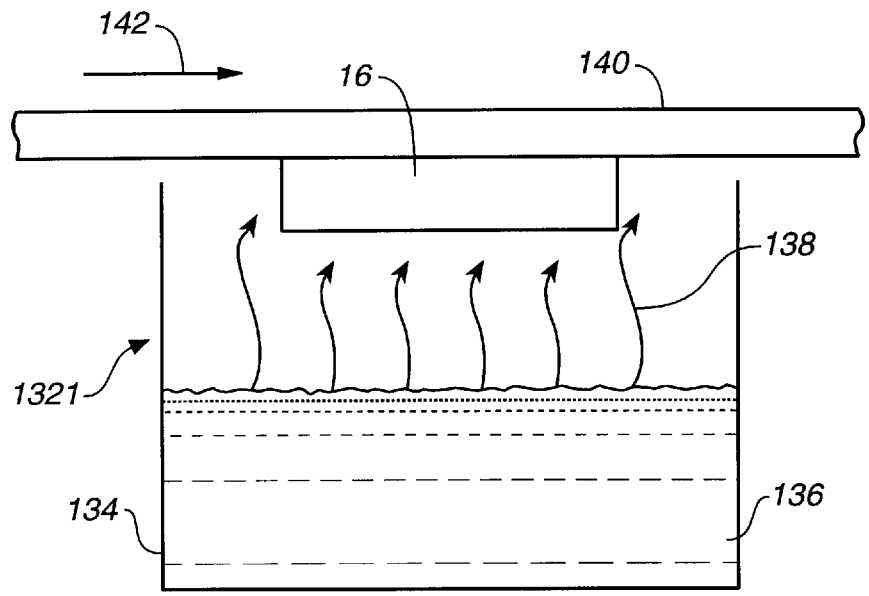
FIG._8
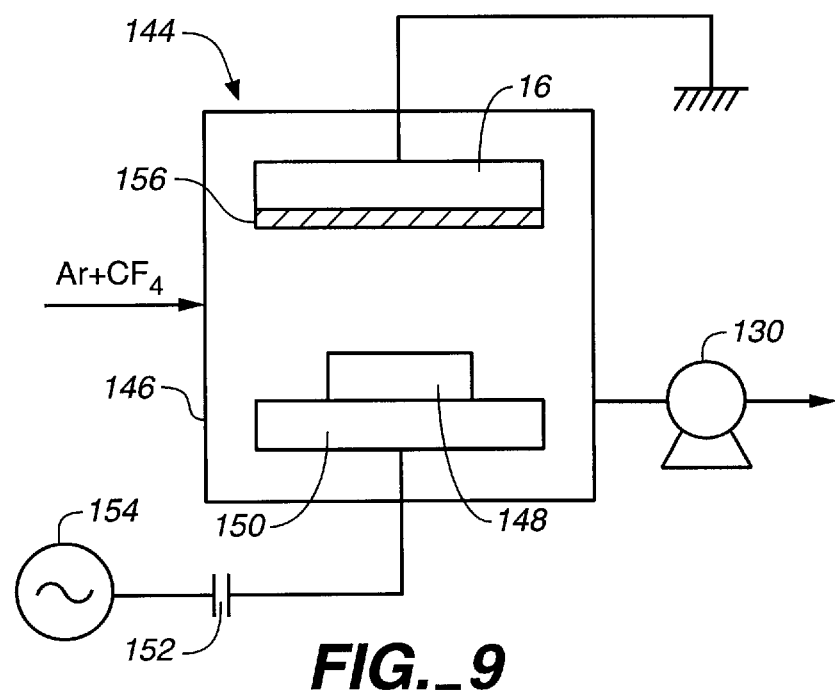
FIG._9

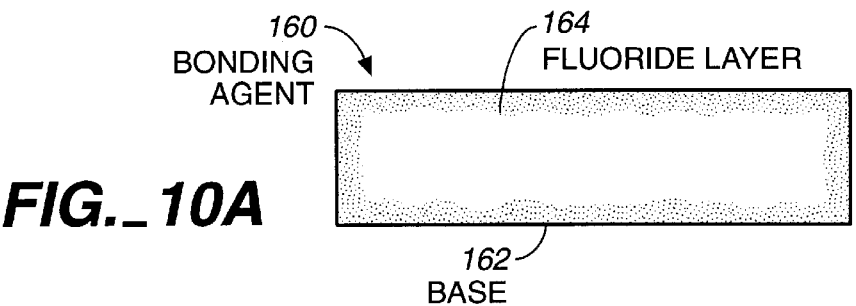
FIG._10A
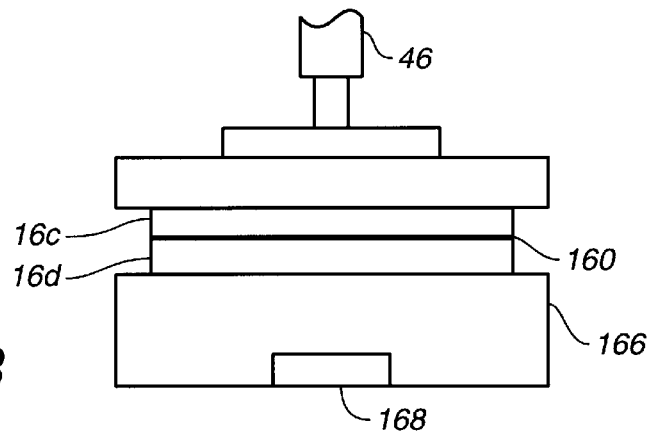
FIG._10B
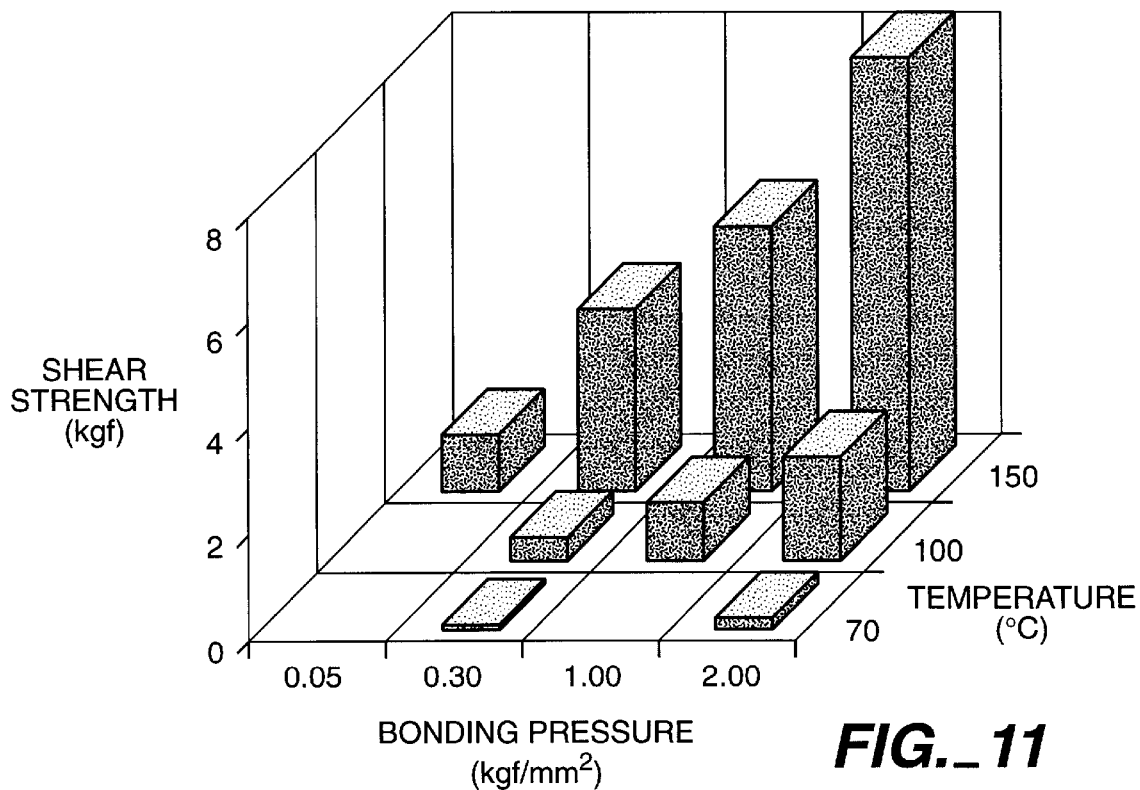
FIG._11

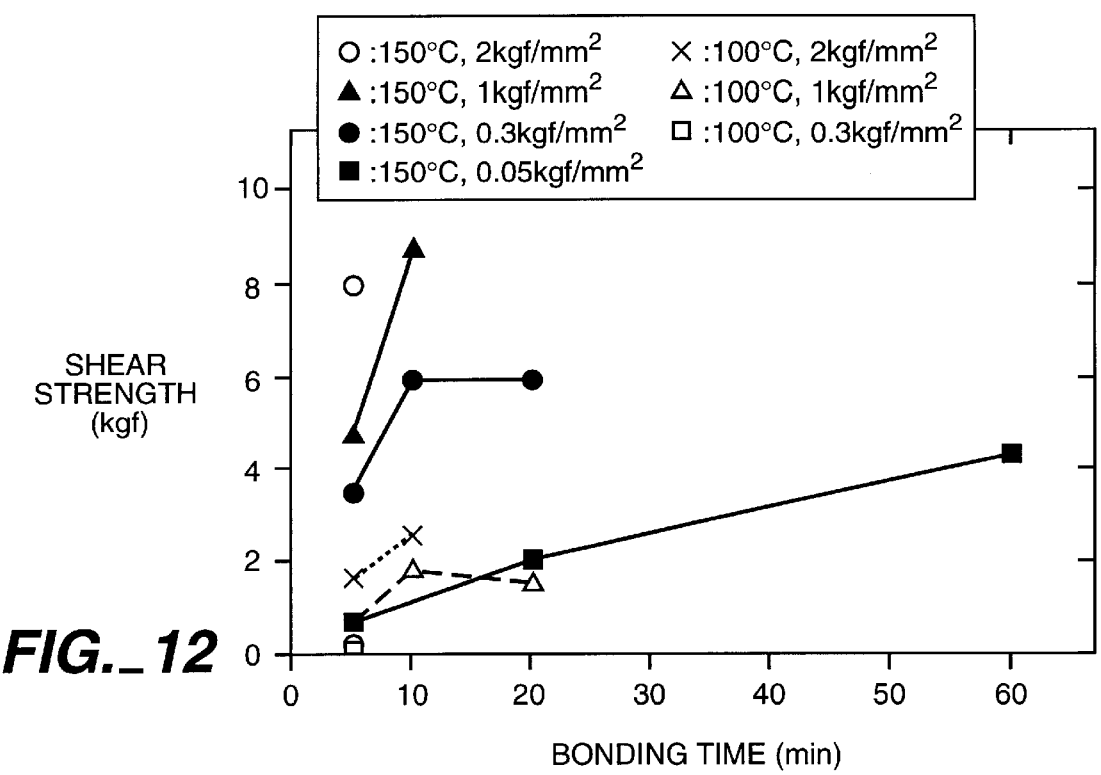
FIG._12
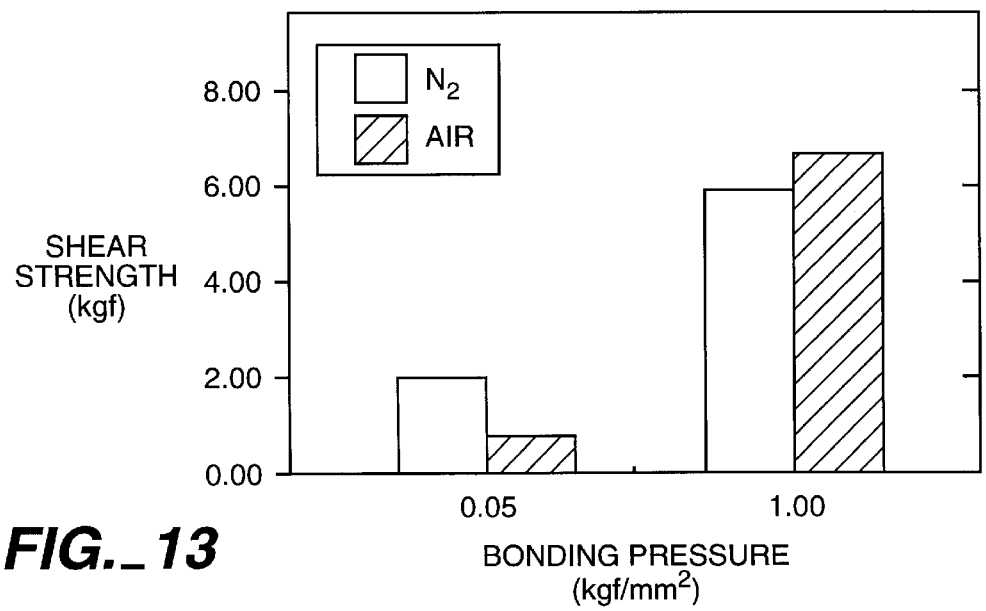
FIG._13

| UNTREATED / FLUORINATED | 60-40 SOLDER | TIN Sn | COPPER Cu | ALUMINUM Al | ALUMINA Al$_2$O$_3$ | SILVER Ag | GOLD Au | INDIUM In |
|---|---|---|---|---|---|---|---|---|
| 60-40 SOLDER | — | — | ○ | ○ | — | — | ○ | — |
| TIN Sn | — | ○ | — | ○ | ○ | ○ | ○ | — |
| COPPER Cu | ○ | — | — | ○ | — | — | — | ○ |
| ALUMINUM Al | — | — | — | — | — | — | — | — |
| ALUMINA Al$_2$O$_3$ | — | — | — | ○ | ○ | — | — | ○ |
| SILVER Ag | ○ | — | ○ | ○ | — | — | — | — |
| GOLD Au | — | — | — | ○ | — | — | — | — |
| INDIUM In | — | — | — | — | — | — | — | — |

FIG._14

METHOD AND APPARATUS FOR SOLID BONDING, A CONDUCTOR BONDING METHOD, A PACKAGING METHOD, AND A BONDING AGENT AND A METHOD FOR MANUFACTURING A BONDING AGENT

BACKGROUND OF THE INVENTION

1. Field of the Invention

The present invention relates to a solid bonding method for bonding a metal and a metal, a metal and a ceramic, or other solid materials. More specifically, the present invention relates to a solid bonding method and apparatus for bonding a solid to a solid without melting a bonding agent or the bonded solids. The present invention further relates to a conductor bonding method, a packaging method, a bonding agent, and to a method for manufacturing a bonding agent.

2. Description of the Related Art

A common method of bonding two metals, such as copper to copper, or copper to aluminum, or two dissimilar solids such as a metal and ceramic, or metal and glass, is to use a bonding agent with a low melting point, such as solder or indium, to fuse the two solids together. A method more recently developed for bonding two metals involves placing the metals to be bonded in a vacuum chamber, irradiating the bonding surfaces of the metals with an ion beam to remove any surface oxides, and then heating and applying pressure to the metals to bond them together.

A common electronic component comprises a quartz oscillator or other electronic part vacuum sealed inside a ceramic or metallic package. During this packaging operation, the electronic component is typically placed in a bottom package cover in a vacuum environment, a top package cover is then placed on the package bottom, and the top and bottom are then bonded together. Bonding is accomplished by coating a soft metallic bonding agent with a low melting point, such as solder or indium, on the bonding surface of either the bottom or top cover. The covers are then placed together in a specific alignment and heat is applied to melt the low melting point bonding agent and fuse the top and bottom package parts together.

Japanese Unexamined Patent Publication (kokai) H1-270574 (1989-270574) teaches another method for bonding a ceramic and a ceramic, or a ceramic and a metal. In this method a ceramic is immersed in a molten halide-fluoride bath containing at least one of the following: a halide of an alkaline metal and an alkaline-earth metal, and a fluoride of an alkaline-earth metal. The bath is then heated to 700° C. to 1100° C., forming a non-oxide surface layer of, for example, a carbide, a boride, a nitride, or a silicide, on the surface of the ceramic. Two ceramic bodies with a non-oxide surface layer thus formed, or a metal and a ceramic with such a non-oxide surface layer, are then heated and bonded.

Japanese Unexamined Patent Publication (kokai) H10-36145 (1998-36145) teaches a method for bonding members of which a primary constituent of the bonding surface is silicon dioxide. In this method, the bonding surfaces of the members are permeated with a solution containing hydrofluoric acid to bond the members together.

A further technology described in the literature involves placing chrome bonding members in a high temperature fluoride gas environment at approximately 800° C. to 900° C., resulting in pyrolysis of the fluoride gas and fluorination of the bonding members. The members are then kept in this environment while being bonded.

Bonding solids with conventional soldering methods requires the use of flux, and typically must be followed by a washing process to remove sludge. In addition, when members are bonded by means of melting a bonding agent such as solder or indium, the alignment of the bond members is easily disturbed and controlling the final shape of the bonded articles during the bonding process is difficult. As a result, not only do shape inconsistencies occur, but the final appearance of the bonded article is poor.

It should be noted that shape inconsistencies and sludge problems also occur during bonding in the above-noted vacuum packaging methods because the bond is still established by melting a bonding agent.

It should be further noted that the above-noted bonding method in which surface oxides are removed from the bonded metals by exposure to an ion beam in a vacuum before bonding is not subject to these sludge problems and enables easier shape control because a bonding agent is not used. On the other hand, equipment costs are high, the equipment is large, and equipment operating costs are high because the process must be performed in a vacuum, and heat and pressure must also be applied in a vacuum for bonding.

Furthermore, with the bonding method taught in Japanese Unexamined Patent Publication (kokai) H1-2705741 (1989-270574), the ceramic must be immersed in a liquid halide-fluoride bath, and heated for an extended time at 700° C. to 1100° C. to deposit a non-oxide surface layer. This process is both difficult and time-consuming, and is only suitable for bonding a limited range of materials, that is, a ceramic to a ceramic, or a ceramic to a metal.

The bonding method taught in Japanese Unexamined Patent Publication (kokai) H10-36145 (1998-36145) works by dissolving bonding members of which a primary constituent is silicon dioxide in hydrofluoric acid. As a result, in addition to being extremely limited in the range of materials with which it can be used, this method requires much time for bonding, and is not easy to use because of the use of a hydrofluoric acid solution in the bonding process.

The above-noted method for bonding by means of pyrolizing a fluoride gas in a high temperature environment requires that the entire process be completed at a high temperature, and therefore requires a high temperature oven. As a result, equipment costs are high, the process can only be applied with chrome and other high melting point materials, and cannot be used with low melting point materials.

OBJECTS OF THE INVENTION

It is therefore an object of the present invention to resolve the aforementioned problems by enabling bonding of solid bodies without using a bonding agent.

It is a further object of the present invention to stabilize the final shape of a bonded article during bonding.

It is a yet a further object of the present invention to achieve bond members having a surface containing a halogen by means of halogenation (fluorination) in a dry process performed at a low temperature, such as room temperature.

In addition, it is a still further object of the present invention to provide a bonding agent whereby solid bodies can be bonded without using flux and without melting.

SUMMARY OF THE INVENTION

To achieve the aforementioned objects, the present invention provides a solid bonding method for bonding a first bond member and a second bond member where the first bond member has at least one surface containing a halogen as a result of a halogenation process, the second bond member is of the same or is not of the same material as the first bond member, and the first and second bond members are bonded by means of contact through the halogenated surface.

Halogens such as fluorine and chlorine readily bond with a variety of elements. As a result, a solid bonding method according to the present invention can bond two solid bond members of the same or dissimilar materials without using solder, indium, or other bonding agent, and without melting the bond members. Positioning and shape control during bonding are also easy because bonding is achieved without melting a bonding agent or the bond members, and the final shape of the bonded members can be stabilized. Sludge is also not produced, and is therefore not a problem, because flux is not used.

When a surface of a bond member does not contain halogen, a surface containing halogen can be easily created by halogenating a bond member surface. In this case, fluorination is the preferable halogenation method because of the strong bond fluorine forms with other elements.

Various fluorination methods can be used. An exemplary fluorination method exposes a surface of the bond member to a mixed gas of water vapor and a reactive fluoride gas such as $F_2$, HF, or $COF_2$. These reactive fluoride gases produce active fluorine by reaction with water (water vapor). It should be noted that as used herein "active fluorine" refers to, for example, fluorine ions, fluorine radicals, and fluorine atoms.

For example, if the fluoride gas is, hydrogen fluoride (HF), fluorine ions are produced by the following reaction under the assumptions (reaction conditions) of the present invention.

$$2HF + H_2O \rightarrow HF_2^- + H_3O^+ \quad (1)$$

It should be further noted that fluorine ions can be similarly produced when $F_2$ or $COF_2$ is substituted for HF and mixed with water (water vapor). Alcohol vapor can also be substituted for water vapor.

The fluorine atom is, after hydrogen, the smallest atom. Fluorine is also the most electronegative element and the most powerful oxidizing agent known, making it possible to produce fluorides by direct reaction with substantially any other element. The surface of a metal, such as tin, exposed to air is also covered by an oxide layer approximately 100 angstroms (0.01 μm) thick. When active fluorine contacts such a surface, the fluorine is attracted to the metal, some reacting with the metal oxide (tin oxide) surface layer, and some travelling deeper into the metal. The amount and depth of fluorine penetration into the metal is determined by the conditions of the fluorination process.

The present inventors hypothesize that part of the fluorine in the metal oxide layer replaces oxygen and stabilizes in a metallic fluoride or a fluoride of a metallic oxide. For example, if the metal oxide layer is tin oxide (SnO), the following reactions are believed to occur.

$$SnO + H_2O \rightarrow Sn^{2+} + 2OH^- \quad (2)$$

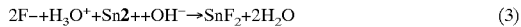

$$2F^- + H_3O^+ + Sn2 + + OH^- \rightarrow SnF_2 + 2H_2O \quad (3)$$

While part of any excess fluorine and oxygen freed from the tin oxide is released into space, most is diffused into the metal (tin). The fluorine also breaks metallic bonds, diffusing into the matrix and functioning as a pilot guiding oxygen deeper into the tin, thereby forming an oxide layer that is thicker than before fluorination. The oxide layer that is the outermost surface layer before fluorination becomes temporarily low in oxygen as, a result of fluorination, but when the fluorinated surface reacts with water, the reaction between the water and fluorine in the metal causes some of the fluorine to be replaced by oxygen, resulting in reoxidation of the surface layer. Because the metal from which fluorine is freed is active at this time, the surface layer becomes more oxidized than before fluorination.

Because it is therefore possible according to the present invention to fluorinate a bond member at a low temperature, such as room temperature, using this phenomenon, processing is simple, the processing apparatus can be simplified, the degree of fluorination can be controlled, and a bond member having fluorine in the surface can be easily achieved.

A reactive fluoride gas can be generated for this process by releasing an electric discharge into a mixed gas of water vapor and a fluoride gas (such as $CF_4$ or $SF_6$) at or near atmospheric pressure. Using this process, it is possible to easily generate a reactive fluoride gas such as $F_2$, HF, or $COF_2$ using a stable, safe fluoride gas supply.

Fluorination can also be accomplished by producing active fluorine by means of an electric discharge in a gas containing at least a fluoride gas (such as $F_2$, HF, $COF_2$, or $CF_4$), and then exposing a bond member to this active fluorine. This method enables stable fluorination because water (water vapor) is not used, and can also prevent equipment corrosion. Discharging can be accomplished in a vacuum, or at or near atmospheric pressure.

The fluorination rate can also be increased by placing the bond member in the discharge area. On the other hand, the bond member can be protected from direct exposure to plasma and other high energy particles resulting from the discharge, and can therefore be protected from damage caused by plasma and high energy particles, by placing the bond member outside the discharge area and conducting the active fluorine generated in the discharge area to the bond member for fluorination.

Yet further, fluorination can be accomplished by irradiating a fluoride gas such as HF, $F_2$, $COF_2$, or $CF_4$ with ultraviolet light to generate active fluorine, and then exposing the bond member to this active fluorine. This method enables the fluorination apparatus to be relatively simple in construction because active fluorine can be generated by simply irradiating a fluoride gas with ultraviolet light.

It is also possible to fluorinate a bond member by exposure to a vapor containing a reactive fluoride, for example, HF vapor. The fluorination apparatus in this case can also be simple in construction because it is only necessary to vaporize a reactive fluoride gas, and the operating cost can therefore also be reduced.

It will be obvious that each of the fluorination methods described above is a so-called dry method, and differs from so-called wet methods in which the bond member to be fluorinated is directly immersed in a solution containing fluorine. In addition to simplifying the fluorination process, a dry method enables simpler materials handling, and high precision control of the fluorination process.

Bonding a first bond member and a second bond member can also be accomplished by placing the first bond member and second bond member one on top of the other, and then heating a bond area to a temperature below the melting point of both bond members. The bonding apparatus required for this method is extremely simple because the bond members can be bonded by simply placing them in contact and heating. The bonding time, however, is slightly longer in this case, and the bond strength is slightly low.

Heating the bond area can also be done at atmospheric pressure. A simple bonding apparatus and procedure can therefore be used as bonding requires only some means of heating the bond members, such as a heating block or infrared heater.

Heating can also be done in an inert gas environment. When an inert gas is used for heating, oxygen, which can interfere with bonding, cannot invade the bond area. Bonding is thus accelerated while also increasing bond strength. In addition, members that are easily oxidized can be also be easily bonded.

It is further preferable in some cases to apply pressure to increase contact pressure between the bond members. When pressure is applied for bonding, the contact area between the bond members is increased and tighter contact between the bond members is achieved. Fluorine thus migrates and diffuses more easily, and bonding at room temperature can be easily accomplished.

Adding pressure can also shorten the bonding time and increase bond strength. Pressure can also be added at atmospheric pressure or in an inert gas environment. When pressure is applied at atmospheric pressure, the operating cost can be reduced. When pressure is applied in an inert gas, the effects of oxygen can be avoided, and bond strength can therefore be improved while bonding time is shortened as described above.

It is also possible to apply pressure while also heating the bond members to a temperature below the melting point of both bond members. This provides for even more active fluorine migration and diffusion between the bond members, and thus further shortens the bonding time and bond strength.

When fluorinated tin and another member, copper, for example, are placed in contact, and pressure and heat are then applied, the following phenomena are believed by the present inventors to occur.

Fluorine moves from the surface of the fluorinated tin and diffuses into the copper. The metal (tin) from which the fluorine moved is thus activated, enabling oxygen from below the surface of the metal to disperse and bond with active tin atoms, thereby increasing surface oxidation. Part of the active tin atoms, however, are believed to become free radicals. The fluorine that has migrated to the copper side exchanges with oxygen in the surface of the copper, and oxygen from the copper surface thus migrates to the tin side. In addition, part of the fluorine that had migrated to the copper migrates back to the tin. Fluorine thus works to replace oxygen in the metal and break metal bonds. Unbonded tin and copper atoms are also dispersed into each other, and form metal-metal bonds. This was determined by the observation of $Cu_6Sn_5$ in the surface of both metals when the crystal lattice was observed with a tunneling electron microscope (TEM).

Bonding can also be accomplished while applying ultrasonic vibration to contacting bond members. Ultrasonic vibration works to increase the temperature of the bond area. In addition, when an oxide layer is present at the bond area, ultrasonic vibration can also remove the oxide layer, helping to shorten the bonding time and improve bond strength.

An electric field can also be applied to the touching first bond member and second bond member. Applying an electric field to the bond members forces halogen ions in the bond members to move, thereby increasing bond strength. This also makes it possible to bond materials that are difficult to bond using just heat and pressure.

The first and second bond members can be any combination of metal, such as tin, indium, copper, and various alloys; glass, alumina, and ceramic; silicon or other semiconductor. When at least one of the bond members is tin or a tin alloy, such as solder, Sn—Ag, or Sn—Zn, a good bond can be formed with the other bond member.

The present invention further provides a solid bonding method whereby a fluoride layer is deposited on a surface of a first bond member or a second bond member bonded thereto, and the first and second bond members are bonded with this fluoride layer disposed therebetween. By thus forming a fluoride layer on a bond member having no fluorine in the surface thereof, the solid bonding method of the present invention can easily and reliably create a bond with a bond member having no fluorine in the surface thereof. Bond members of substantially any materials can also be bonded because a fluoride layer is thus deposited on the surface.

A fluoride layer can be formed by sputtering using a metal target and a gas mixture containing a small amount of fluoride gas such as $CF_4$ in argon (Ar) for plasma generation, or sputtering using a fluoride material, such as tin fluoride, as the target. The fluoride layer can also be tin fluoride or a fluoride of a tin alloy.

When a fluoride layer is thus imparted to a bond member, the bond members can be stacked as described above and heated at atmospheric pressure or in an inert gas for bonding. In this case the temperature to which the bond area is heated is a temperature below the melting point of the fluoride layer. Pressure can also be applied at atmospheric pressure or in an inert gas environment. In this case, too, the temperature to which the bond area is heated is a temperature below the melting point of the fluoride layer. Yet further, ultrasonic vibration can be additionally applied with pressure. It will also be obvious that a voltage can be yet further additionally applied to the bond members.

A solid bonding apparatus for accomplishing a bonding method according to the present invention as described above comprises a halogenation processor for adding a halogen to a surface of a bond member, and a bonding processor for contacting and bonding a second bond member to the surface of a first bond member to which halogen has been added by the halogenation processor.

A solid bonding apparatus according to the present invention can thus impart a halogen to a bond member that does not have a halogen in its surface, and bond members can therefore be easily bonded without using a bonding agent.

When the halogenation processor is a fluorination processor, bond strength can be increased, bonding time can be shortened, and a bond with excellent bond characteristics can be achieved.

An exemplary fluorination processor comprises a fluorination chamber in which a bond member to be fluorinated is placed, a fluorination gas supply means for supplying a reactive fluoride gas to the fluorination chamber, and a water vapor supply means for supplying water vapor to the fluorination chamber.

An exemplary fluorination gas supply means comprises a discharge unit for generating reactive fluoride gas by means of an electric discharge in a mixed gas containing a fluoride gas and water vapor at or near atmospheric pressure.

An alternative exemplary fluorination processor comprises a discharge unit in which a bond member to be fluorinated is placed for irradiation with active fluorine generated by means of an electric discharge in gas containing a fluoride gas at or near atmospheric pressure.

A further alternative exemplary fluorination processor comprises a fluorination chamber in which a bond member to be fluorinated is placed, and a discharge unit for generating active fluorine by means of an electric discharge in a gas containing a fluoride gas at or near atmospheric pressure, and supplying active fluorine to the fluorination chamber.

Yet further alternatively, an exemplary fluorination processor comprises a discharge chamber in which a bond member to be fluorinated is placed, and active fluorine is generated by means of an electric discharge in a gas containing a fluoride gas at or near atmospheric pressure, and sprayed onto the bond member, and a vacuum pump for pumping the discharge chamber to a vacuum pressure level.

In a further version of the invention, the fluorination processor comprises an ultraviolet irradiation means for generating active fluorine by irradiating fluoride gas with ultraviolet light.

In a further version of the invention, the fluorination processor comprises a fluorination vapor supply means for generating a reactive fluoride vapor, and a transportation means for transporting a bond member to be fluorinated through the fluoride vapor generated by the fluorination vapor supply means.

A solid bonding apparatus according to another version of the present invention comprises a fluoride layer formation unit for depositing a fluoride layer on a surface of a bond member, and a bonding processor for bonding a second bond member in contact with the fluoride layer formed by the fluoride layer formation unit on a first bond member. A solid bonding apparatus thus comprised can thus easily bond a bond member that is not suited to fluorination. The fluoride layer formation unit can additionally comprise a sputtering unit.

In a further version of the invention, the bonding processor comprises a heating means for heating the bond area of the touching first bond member and second bond member to a temperature below the melting point of both bond members.

The bonding processor can yet further comprise a pressure-applying means for increasing contact pressure between a first bond member and second bond member. Further additionally, the bonding processor comprises a vibration generating means for applying ultrasonic vibration to touching bond members. Yet further additionally, the bonding processor comprises an electric field generating means for applying an electric field to contacting bond members. Yet further additionally, the bonding processor comprises a bonding chamber in which the bond members are placed and to which an inert gas is supplied.

The present invention further provides a conductor bonding method for bonding a conductor with another conductor at a fluorinated surface of one conductor after fluorination of at least one surface of the mutually bonded conductors. The method of the present invention can thus bond conductors without using solder. A lead-free bond can thus be achieved, and environmental problems associated with lead can be avoided. Semiconductors to be bonded can thus be precisely positioned during bonding because solder or other bonding agent is not melted. Because flux is not used, the time and problems associated with removing sludge are also eliminated.

The halogenation process is preferably fluorination, which has excellent bonding characteristics. The same fluorination processes described above with reference to the solid bonding method of the invention can also be used. That is, fluorination can be accomplished by exposing a conductor to a mixed gas of water vapor and a reactive fluoride gas. A reactive fluoride gas can be produced by an electrical discharge in a mixed gas of water vapor and fluoride gas at or near atmospheric pressure.

Fluorination can also be accomplished by generating active fluorine by means of an electric discharge in a gas containing at least fluoride gas, and then exposing a conductor to the active fluorine. In this case, the discharge can be in a vacuum or at or near atmospheric pressure. Fluorination can be accomplished with the conductor placed in a discharge area, or by placing the conductor outside of a discharge area, and then conducting the active fluorine generated in the discharge area to the conductor.

Fluorination can also be accomplished by irradiating a fluoride gas with ultraviolet light to generate active fluorine, and then exposing a conductor to the resulting active fluorine, or by exposing a conductor to vapor containing a reactive fluoride.

Conductor bonding in a conductor bonding method according to the present invention can be accomplished using the same processes described in the above-noted solid bonding method of the invention, that is, by placing conductors to be bonded together one on top of the other, and then heating the bonding area to a temperature below the melting point of both conductors. The heating step can be accomplished at atmospheric pressure or in an inert gas. Pressure can also be applied to increase contact pressure between the conductors while heating the bonding area to a temperature below the melting point of both conductors. In addition, ultrasonic vibration can be applied to the conductors. An electric field can also be applied to the contacting conductors as may be required.

The present invention further provides a conductor bonding method whereby a fluoride layer is deposited onto a surface of at least one conductor to be bonded, and then bonding this conductor with another conductor with this fluoride layer disposed therebetween. It should be noted that a lead-free conductor bond can be achieved by this method.

A fluoride layer can be deposited using a sputtering method as described in the above-noted solid bonding method of the invention. The fluoride layer is preferably a tin fluoride or tin alloy fluoride layer. When conductors are bonded with the fluoride layer therebetween, the conductors can be placed together one on top of the other, and the bonding area then heated to a temperature below the melting point of the fluoride layer. The heating step can be accomplished at atmospheric pressure or in an inert gas.

Bonding conductors with a fluoride layer therebetween is preferably accomplished by increasing the contact pressure between the conductors using a method as described in the above solid bonding method of the invention. Pressure can be applied at atmospheric pressure or in an inert gas. The bonding area is also heated to a temperature below the melting point of the fluoride layer. In addition, ultrasonic vibration can be applied to the contacting conductors. An electric field can also be applied to the contacting conductors.

The present invention also provides a packaging method for vacuum packaging an electronic component, wherein a contact part of a top part or bottom part of a package is halogenated, and the top and bottom package parts are then bonded in mutual contact.

It will be noted that a packaging method thus comprised according to the present invention does not melt solder, indium, or other bonding agent to form a bond. As a result, the top and bottom package parts can be accurately positioned, the package can be bonded with consistent shape control, and a step for removing sludge can be eliminated because flux is not used.

In this method fluorination is the preferred form of halogenation, and can be accomplished using any of the above-noted methods of the invention. That is, the package parts can be fluorinated exposing the bond area to a mixed gas of water vapor and a reactive fluoride gas. A reactive fluoride gas can be produced by an electric discharge in a mixed gas of water vapor and fluoride gas at or near atmospheric pressure.

Fluorination can also be accomplished by generating active fluorine by means of an electric discharge in a gas containing at least fluoride gas, and then exposing the contact area of at least one package part to the active fluorine. In this case, the discharge can be in a vacuum or at or near atmospheric pressure. Fluorination can be accomplished with the package part placed in a discharge area, or by placing the package part outside of a discharge area, and then conducting the active fluorine generated in the discharge area to the package part.

Fluorination can also be accomplished by irradiating a fluoride gas with ultraviolet light to generate active fluorine, and then exposing the contact area of a package part to the resulting active fluorine, or by exposing a package part to vapor containing a reactive fluoride.

Package bonding in a packaging method according to the present invention can be accomplished using the same processes described in the above-noted solid bonding method of the invention, that is, by placing top and bottom package parts together one on top of the other, and then heating the bonding area to a temperature below the melting point of the package parts.

Pressure can also be applied lot increase contact pressure between the package parts. The bonding area can also be heated at this time to a temperature below the melting point of both package parts.

As in the above solid bonding and conductor bonding methods of the invention, ultrasonic vibration can also be applied to the contacting top and bottom parts. It is also possible to apply an electric field.

If a vacuum package is desired, the bonding procedure can also be performed in a vacuum.

The present invention also provides a packaging method for vacuum packaging an electronic component by means of depositing a fluoride layer on a top part or bottom part of a package, and then bonding the top and bottom package parts in mutual contact with this fluoride layer disposed therebetween. The same effects previously described above are also achieved with this method.

This fluoride layer can be formed by a sputtering technique. The fluoride layer is also preferably tin fluoride or tin alloy fluoride. Bonding in this case is also possible as described above, that is, by placing top and bottom package parts together one on top of the other, and then heating the bonding area to a temperature below the melting point of the fluoride layer.

Pressure can also be applied to increase contact pressure in the bonding area. The bonding area can also be heated at this time to a temperature below the melting point of the fluoride layer.

As in the above solid bonding and conductor bonding methods of the invention, ultrasonic vibration can also be applied to the contacting top and bottom parts. It is also possible to apply an electric field.

The present invention furthermore provides a bonding agent that is disposed between a pair of solids for bonding said solids, and is characterized by a surface of the bonding agent being fluorinated. Because the fluorine in the surface of the bonding agent reacts and bonds easily with virtually any element, a bonding agent comprised according to the present invention can be inserted between two members to bond those members together without requiring melting of the bonding agent. Because it is thus not necessary to melt the bonding agent or use flux, the members being bonded can be easily and accurately positioned, and steps required for cleaning and removing sludge can be eliminated.

Tin or a tin alloy can be used For the bonding agent. Preferable tin alloys include, but are not limited to, the following: solder, tin-zinc (Sn—Zn) alloy, and tin-silver (Sn—Ag) alloy. It should be further noted that by using Sn—Zn alloy or Sn—Ag alloy, it is not necessary to use lead. A lead-free bonding agent can therefore be achieved, and environmental problems associated with the use of lead can be avoided.

The present invention further provides a manufacturing method for manufacturing a bonding agent disposed between a pair of solids for bonding said solids. This manufacturing method comprises a step for fluorinating the bonding agent by exposure to a mixed gas containing a reactive fluoride gas and water vapor. As described in the other bonding methods of the invention described above, reactive fluoride gas can be generated by an electric discharge in a mixed gas of water vapor and fluoride gas at or near atmospheric pressure.

The present invention provides another manufacturing method for manufacturing a bonding agent disposed between a pair of solids for bonding said solids. This manufacturing method comprises a step for fluorinating the bonding agent by exposure to active fluorine produced by an electric discharge in a gas containing a fluoride gas. As described above, the discharge in this method can be in a vacuum or at or near atmospheric pressure. Fluorination can also be accomplished by placing the bonding agent in the discharge area for direct fluorination, or outside the discharge area. In this latter case, active fluorine generated in the discharge area must be conducted to where the bonding agent is located for fluorination.

A further manufacturing method according to the present invention for manufacturing a bonding agent disposed between a pair of solids for bonding said solids comprises a step for fluorinating a bonding agent by exposing the bonding agent to active fluorine where the active fluorine is produced by irradiating fluoride gas with ultraviolet light.

Yet a further manufacturing method according to the present invention for manufacturing a bonding agent disposed between a pair of solids for bonding said solids comprises a step for fluorinating a bonding agent by exposing the bonding agent to a vapor containing a reactive fluoride.

In each of these bonding agent manufacturing methods, the bonding agent is preferably tin or a tin alloy.

Other objects and attainments together with a fuller understanding of the invention will become apparent and appreciated by referring to the following description and claims taken in conjunction with the accompanying drawings.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 1 is a simplified drawing of a bonding apparatus according to a first embodiment of the present invention;

FIG. 2 is a simplified drawing of a batch fluorination process according to a second embodiment of the present invention;

FIG. 3 is a simplified drawing of a method for generating a reactive fluoride gas according to a third embodiment of the present invention;

FIG. 4 is a simplified drawing of a fluorination process section in a bonding apparatus according to a fourth embodiment of the present invention;

FIG. 5 is a simplified drawing of a further fluorination process according to a fifth embodiment of the present invention;

FIG. 6 is a simplified drawing of a further fluorination process section in a bonding apparatus according to a sixth embodiment of the present invention;

FIG. 7 is a simplified drawing of a fluorination process using a vacuum discharge according to a seventh embodiment of the present invention;

FIG. 8 is a simplified drawing of a fluorination process using vapor according to an eighth embodiment of the present invention;

FIG. 9 is a simplified drawing of a sputtering method according to the present invention for forming a sputtered fluoride layer;

FIG. 10A is a typical section view of a bonding agent according to the present invention, and FIG. 10B is used to describe a bonding method using this bonding agent according to the present invention;

FIG. 11 is a graph showing the relationship between bonding pressure, bonding temperature, and the shear strength of a bond formed by means of the present invention;

FIG. 12 is a graph showing the relationship between bonding temperature, bonding time, and the shear strength of a bond formed by means of the present invention;

FIG. 13 is a graph comparing the shear strength of a bond formed by means of the present invention in air and in nitrogen; and FIG. 14 is a table showing the viability of bonds between various fluorinated materials and unprocessed (unfluorinated) materials.

DESCRIPTION OF THE PREFERRED EMBODIMENTS

Preferred embodiments of a solid bonding method, a solid bonding apparatus, a conductor bonding method and packaging method, and a bonding agent and bonding agent manufacturing method according to the present invention are described below with reference to the accompanying figures.

FIG. 1 is a descriptive drawing of a solid bonding apparatus according to a first embodiment of the present invention. As shown in FIG. 1, this bonding apparatus 10 comprises a fluorination process section 12 used for a halogenation process, and a bonding process section 14.

The fluorination process section 12 adds fluorine (F) to a surface of a bond member 16, which can be metal, glass, ceramic, or other solid material, and comprises a reaction chamber 18 for supplying hydrogen fluoride gas (HF), a reactive fluoride gas, to the top surface of the bond member 16. An HF gas supply unit (fluoride gas supply means) 24 and vapor generator (vapor supply means) 26 are connected by means of lines 20 and 22 to the reaction chamber 18 to supply an HF gas and vapor mixture to reaction chamber 18.

Bond member 16 is transported in the direction of the arrow 30 by means of a conveyor or other carrier 28 through the bottom of the reaction chamber IS so that the top of bond member 16, that is, the bonding surface, is fluorinated by the HF gas and vapor mixture.

That is, when bond member 16 is exposed to the HF gas and vapor mixture, HF and $H_2O$ react shown in equation (4) on the surface of bond member 16.

$$2HF + H_2O \rightarrow HF_2^- + H_3O^+ \qquad (4)$$

Hydrogen fluoride ions ($HF_2^-$) thus react with the surface of the bond member 16, and thereby fluorinate the surface.

When bond member 16 is a metal, the surface thereof is typically coated with a natural oxide layer as a result of exposure to air. The surface is fluorinated by the oxygen in this oxide layer being replaced by an F in the $HF_2^-$, and a surface layer with a mixed composition of fluorine and oxygen is formed.

When bond member 16 is a silicide such as glass, the surface of bond member 16 is also fluorinated by a reaction as described above. When silicon (Si), for example, in the glass reacts with fluorine and vaporizes, forming $SiF_4$ in this case, a fluoride not having four fluorine atoms, $SiF_2$, for example, is left and the surface of bond member 16 is fluorinated.

It should be noted that during the bond member 16 fluorination process it is possible to stop carrier 28 and close the bottom of reaction chamber 18 by means of a shutter, not shown in the figures, to prevent the process gas mixture from leaking outside reaction chamber 18.

Bonding apparatus 10 further comprises a loading robot 32 for loading the fluorinated bond member 16 into bonding process section 14.

The bonding process section 14 comprises a bonding chamber 34 with a table 36 inside bonding chamber 34. A first bond member 16a and a second bond member 16b are stacked together on table 36. A press 38 is disposed above table 36. Press 38 can thus be driven to press bond members 16a and 16b tightly together so as to form a bond therebetween. It should be noted that the bonding surface of at least one of the bond members 16a and 16b has been fluorinated in the fluorination process section 12.

It should be further noted that in this preferred embodiment the table 36 and press 38 are made of glass or other dielectric material, and electrodes 42 and 40 are disposed below table 36 and above press 38, respectively. These electrodes 42 and 40 are connected to DC power supply 44, or field generating means for applying an electric field to bond members 16a and 16b as required through the table 36 and press 38.

It should be yet further noted that when one or both of the bond members 16a and 16b is glass, ceramic, or other insulator, the table 36 and press 38 can be directly used as electrodes.

A cylinder 46, or a pressure-applying means, is provided above electrode 40 with electrical insulation disposed therebetween. Cylinder 46 can thus be operated to increase the contact pressure at the bonding surface between bond members 16a and 16b.

A heater 48, or heating means, is provided below bonding chamber 34, thus enabling the bonded area of the bond members to be heated to a specific controlled temperature below the melting point of bond members 16a and 16b.

Chamber 34 is further connected via line 50 to an argon supply unit 52, or inert gas supply means, thereby enabling an argon gas environment to be created inside bonding chamber 34.

The operation of an apparatus according to this preferred embodiment of the present invention comprised as noted above is described next below.

Bonding apparatus 10 shown in FIG. 1 is controlled by a control apparatus, not shown in the figures, to drive carrier 28 through reaction chamber 18 of the fluorination process section 12 after placing bond member 16 on carrier 28. A mixture of HF gas from HF gas supply unit 24 and vapor from vapor generator 26 is supplied to reaction chamber 18. Exposure of the bond member 16 surface to this mixed gas produces a reaction as described above, and the surface of bond member 16 is thus fluorinated.

The fluorinated bond member 16 is then removed from reaction chamber 18 by carrier 28, transferred by loading robot 32 to the bonding chamber 34 of bonding process section 14, and placed on table 36. A first bond member 16a and a second bond member 16b are thus stacked one on the other on table 36. As also described above, at least one of the mated bonding surfaces of the bond members 16a and 16b has been fluorinated and thus contains fluorine.

Argon is then supplied from argon supply unit 52 to bonding chamber 34 to create an argon environment at a pressure of approximately 1 atmosphere. Cylinder 46 is then operated to lower press 38 and thus apply pressure to bond members 16a and 16b, while also heating bond members 16a and 16b by means of heater 48 to a specific temperature (for example, 150° C.) below the melting point. When bond members 16a and 16b are heated to the specific temperature, the heat and pressure are maintained for a specific period of time to bond first bond member 16a and second bond member 16b.

This bonding mechanism can be explained as follows.

The bond between the atoms bonded with fluorine in the surface layer of the bond member is broken by contact with the surface of the mated bond member, and the atoms then rebond with atoms in the surface layer of the mated bond member. The freed fluorine atoms are dispersed into the bond member, which readily accepts the freed fluorine.

When necessary, for example, when the bond member is a material resistant to fluorine migration during this pressurized bonding step, it is possible to apply a voltage to electrodes 42 and 40 to apply an electric field to bond members 16a and 16b, thereby forcing fluorine ions to move and bond by means of the field strength. An electric field can also be applied to improve the bond strength.

By thus fluorinating at least one bond member to add fluorine to a surface thereof, and then placing the fluorinated surface of one bond member in contact with another bond member to bond the two members together, an apparatus according to a first preferred embodiment of the present invention as described above can bond a solid to a solid without using solder, indium, or other bonding agent as required by conventional techniques.

Furthermore, because the members are not melted and are bonded while in the solid state, positioning, alignment;, and shape control during the bonding process are simple, the finished shape can be stabilized, a good appearance can be achieved after bonding, and there is no problem with sludge because flux is not used.

The equipment can also be simplified because bond member fluorination is accomplished in a so-called dry process. Handling is therefore easy, and the fluorination process can be performed with good precision in a short period of time.

It should also be noted that by applying pressure to first bond member 16a and second bond member 16b to increase the contact pressure between the two members, the contact area is increased, adhesion is improved, and bond strength can be increased.

Yet further, by heating bond members 16a and 16b, the bonding reaction is quickly accomplished, bond strength is increased, and the bonding time is also shortened.

Moreover, by performing the bonding process with an argon environment inside the bonding chamber 34, oxygen, which is a source of bonding problems, is not present. As a result, bonding can be accomplished easily and reliably.

It will also be obvious to one with ordinary skill in the related art that while this preferred embodiment has been described applying both pressure and heat to accomplish bonding, members can be bonded by simply stacking the bond members, heating to an appropriate temperature, for example, 150° C., and leaving the members in this heated environment for a specific period of time without applying pressure.

Furthermore, while this preferred embodiment has been described as operating at atmospheric pressure, a vacuum environment can also be used.

Yet further, while HF gas is used as the reactive fluoride gas in this preferred embodiment, the invention shall not be so limited as $F_2$, $COF_2$, and other gases can be used as the reactive fluoride gas.

In addition, this preferred embodiment has been described as reacting HF and water (vapor) for the fluorination step. The invention shall not be so limited, however, and methyl alcohol, ethyl alcohol, or other alcohol vapor can be used in place of water vapor.

It will be yet further obvious that the present invention shall not be limited to using argon for the inert gas environment. More specifically, nitrogen gas, a rare gas such as helium or neon, or other inert gas can be used as a substitute for argon.

The present invention shall also not be limited to using a fluoride as the halogen. More specifically, chlorine, iodine, bromine, or other halogen can be used depending upon the surface condition of the halogenated member, and compatibility with the other bond member. Chlorine, for example, is considered preferable to fluorine when used with aluminum and similar materials. Chlorination of a bond member, for example, can be easily accomplished by exposing the bond member to HCl gas.

In addition, when the bond member already contains fluorine or another halogen, the halogenation process is not required.

It will also be obvious to one with ordinary skill in the art that while a cylinder is used in the above preferred embodiment as the pressure-applying means, various other mechanisms, such as a cam or motor, can be alternatively used.

A second version of the present invention enabling batch fluorination is shown in FIG. 2. In this apparatus the fluorination process section 12 comprises a fluorination chamber 53 in which bond member 16 is placed. A HF gas supply unit 24 is connected by means of line 20 to the fluorination chamber 53 to supply HF gas to the fluorination chamber 53. A vapor line 56 of which one end is connected to a water bubbling unit 54, that is, a water vapor supply means, is connected to the HF supply line 20 so as to add water vapor to the HF gas flowing through the line 20. An air inlet tube 60 for introducing dilute air from a dilute air supply unit 58 to the water bubbling unit 54 is also connected to the water bubbling unit 54.

In an apparatus thus comprised according to this second embodiment of the present invention, dilute air from the dilute air supply unit 58 is introduced to the water in water bubbling unit 54 by air inlet tube 60 to load the dilute air with water vapor. The water vapor carried by the dilute air is then carried by vapor line 56 and introduced to the HF gas flowing in line 20 to supply a mixture of HF gas, air, and water vapor to the fluorination chamber 53. The gas mixture supplied to the fluorination chamber 53 typically contains approximately 1% HF gas and has a relative humidity of 20%.

By adding water vapor to the HF gas supplied to the fluorination chamber 53, $HF_2-$ is produced as described above, and the bond member 16 is fluorinated.

It should also be noted that $F_2$, $COF_2$, or other halogen gas can be substituted or the HF gas in the preceding embodiment.

A method of generating a reactive fluoride gas is described next below according to a third embodiment of the present invention as shown in FIG. 3.

This fluoride gas generator 62 for producing reactive fluoride gas comprises a bulk gas supply unit 64, a water bubbling unit 66, and an electric discharge unit 68, as shown in FIG. 3. A stable fluoride gas such as $CF_4$ or $SF_6$ is supplied from bulk gas supply unit 64 to water bubbling unit 66 through bulk supply line 70.

The water bubbling unit 66 and electric discharge unit 68 are connected by another supply line 72. A stable fluoride gas, $CF_4$ in this exemplary embodiment, loaded with water vapor by the water bubbling unit 66 can thus be supplied from the water bubbling unit 66 to electric discharge unit 68.

The electric discharge unit 68 comprises a pair of discharge electrodes 76 and 78 disposed inside a discharge chamber 74 so that the mixed gas of water vapor and $CF_4$ passes therebetween at atmospheric pressure. A high frequency power source 80 is connected to one discharge electrode discharge electrode 76; the other discharge electrode 78 is to ground. By applying a high frequency voltage between the discharge electrodes 76 and 78, the electric discharge unit 68 can thus create a gas discharge across the gas mixture between the electrodes.

In an apparatus thus comprised according to this third embodiment of the invention, water vapor is added in the water bubbling unit 66 to the $CF_4$ bulk gas supplied from bulk gas supply unit 64, and the water vapor-loaded $CF_4$ is then introduced to the electric discharge unit 68 at atmospheric pressure. By then discharging a high frequency voltage, for example, 13.56 MHz, from power source 80 between discharge electrodes 76 and 78 through the mixed gas of $CF_4$ and water vapor ($H_2O$), the $CF_4$ and water vapor are reacted, generating reactive fluoride gases such as HF, $F_2$, and $COF_2$. The resulting reactive fluoride gases are then supplied with any unreacted $CF_4$ to the fluorination chamber 53 where they contact and fluorinate bond member 16.

A fluorination process section according to a fourth embodiment of the present invention is described next below with reference to FIG. 4. As shown in FIG. 4, this fluorination process section 82 comprises a discharge unit 84.

This discharge unit 84 comprises high frequency electrode 86 connected to high frequency power source 80, and a ground electrode 88 connected to ground. The bond member 16 to be fluorinated is positioned on the ground electrode 88.

A discharge gas 90 containing at least a fluoride gas is supplied at atmospheric pressure between high frequency electrode 86 and ground electrode 88. This discharge gas 90 can be variously comprised, including argon with $CF_4$ added to a range of several percent to over ten percent $CF_4$, this argon and $CF_4$ gas with oxygen further added, or any of the above-noted fluoride gases.

In a fluorination process section according to a fourth embodiment of the present invention thus comprised, discharge gas 90 is introduced between the high frequency electrode 86 and ground electrode 88, and a high frequency voltage is applied between the high frequency electrode 86 and ground electrode 88 by power source 80 to produce a gas discharge 92. The discharge gas 90 is thus activated, producing active fluorine in the form of fluorine ions, fluorine radicals, and single fluorine atoms. This active fluorine then collides with and fluorinates bond member 16 located on top of ground electrode 88 inside the discharge chamber.

A further fluorination method according to a fifth embodiment of the present invention is shown in FIG. 5. In a fluorination process section 94 according to this preferred embodiment, high frequency electrode 98 of discharge unit 96 is connected to power source 80. A ground electrode 102 is further connected to high frequency electrode 98 through an insulator 100.

Ground electrode 102 is disposed on both sides of high frequency electrode 98 or surrounding high frequency electrode 98 with the bottom end of ground electrode 102 positioned below the bottom end oat high frequency electrode 98. The lower end of ground electrode 102 is also narrowed to the inside to form a spray opening 104. A supply opening 106 is formed at the top of ground electrode 102 so that discharge gas 90 can be introduced through supply opening 106 inside the ground electrode 102.

The area between the bottom of ground electrode 102 and the bottom of high frequency electrode 98 is a discharge area 108 in which a gas discharge is produced. Active fluorine 110 produced by a gas discharge in this discharge area 108 is then sprayed downward from spray opening 104.

A table 112 on which bond member 16 is placed is disposed below spray opening 104.

In a fluorination process section according to a fifth embodiment of the present invention thus comprised, a high frequency voltage is applied between the high frequency electrode 98 and ground electrode 102, and discharge gas 90 is introduced from supply opening 106 into ground electrode 102, generating a gas discharge in discharge area 108 through discharge gas 90. The fluorine gas contained in the discharge gas 90 is thus converted to active fluorine by the gas discharge, and sprayed from spray opening 104 onto the bond member 16 therebelow to fluorinate bond member 16.

With the fluorination method according to a fifth embodiment of the present invention as shown in FIG. 5, the bond member 16 is not located in the discharge area 108. As a result, collision of high energy electrons and ions with bond member 16 can be avoided, and discharge damage can be prevented.

It will also be obvious that a fluorination chamber can be provided in proximity to discharge unit 96 with bond member 16 placed in the fluorination chamber, and the fluorination process accomplished by introducing the active fluorine 110 generated in the discharge area 108 to the fluorination chamber by means of a carrier gas.

A fluorination process section 1121 according to a sixth embodiment of the present invention breaks down a fluoride gas with ultraviolet light for fluorination. As shown in FIG. 6, this fluorination process section 1121 comprises a fluorination chamber 114 in which bond member 16 is placed, and an ultraviolet (UV) lamp 116 provided above fluorination chamber 114 for irradiating the inside of fluorination chamber 114 with UV light.

The UV lamp 116 irradiates the HF, $F_2$, $COF_2$, $CF_4$, or other fluoride gas introduced to fluorination chamber 114 with UV light to break the fluoride gas down into active fluorine to fluorinate bond member 16.

By using a UV lamp 116 to break down the fluoride gas, a fluorination process section 1121 according to this preferred embodiment can be easily constructed and is easy to handle. Irradiating bond member 16 with UV light also has a heating effect whereby the fluorination reaction is accelerated.

FIG. 7 shows a fluorination process section 120 according to a seventh embodiment of the present invention wherein a fluorination process is accomplished by generating active fluorine by means, of a vacuum discharge.

As shown in FIG. 7, this fluorination process section 120 comprises a vacuum chamber 122 with a table 124 in the vacuum chamber 122. A bond member 16 is then placed on table 124, which is grounded.

A discharge electrode 128 connected to a power source 126 is provided above table 124 inside vacuum chamber 122 such that a gas discharge can be produced between the discharge electrode 128 and the grounded table 124 to generate vacuum plasma 129. A vacuum pump 130 is further connected to vacuum chamber 122 so that the pressure inside the vacuum chamber 122 can be reduced to a specific level, for example, 10 Pa to 0.1 Pa.

Bulk gas supply 132 is further connected to vacuum chamber 122, and a discharge gas containing at least a fluoride gas such as $CF_4$ can be supplied from bulk gas supply 132 to vacuum chamber 122.

With a fluorination process section 120 according to a seventh embodiment of the present invention thus comprised, the internal pressure of vacuum chamber 122 is lowered by and maintained at a specific pressure of approximately 10 Pa to 0.1 Pa by vacuum pump 130. A discharge gas containing a fluoride gas is then introduced from bulk gas supply 132 to generate vacuum plasma 129. The active fluorine produced by this vacuum plasma 129 then collides with bond member 16 on table 124, and thus fluorinates bond member 16.

It will also be obvious that bond member 16 can be placed outside the discharge area (the area of vacuum plasma 129). In this case, the active fluorine produced by the vacuum plasma 129 is conducted to where bond member 16 is located for the fluorination step. It is therefore possible to prevent high energy particles from colliding with bond member 16, and it is thus possible to prevent damage to the bond member by the plasma.

FIG. 8 shows a fluorination process section 1321 according to an eighth embodiment of the present invention. As shown in FIG. 8, this fluorination process section 1321 comprises a processing tank 134 in which a processing solution 136 containing fluorine, an HF solution for example, is held so that vapor 138 containing a highly reactive fluoride can be generated. A transportation means 140 is provided above processing tank 134.

Bond member 16 is thus suspended from transportation means 140 and transported thereby with the bonding surface of bond member 16 exposed to the vapor 138 in the processing tank 134 for fluorination. An opening is provided at the top of processing tank 134 to allow the passage of bond member 16.

The apparatus of this embodiment can thus be simplified because it is only necessary to produce a reactive vapor 138 through which bond member 16 is passed and exposed.

A ninth embodiment of the present invention relates to an apparatus for forming a fluoride layer by means of a sputtering process. The sputtering unit 144 shown in FIG. 9 is a high frequency sputtering apparatus having a vacuum pump 130 connected to a vacuum chamber 146 so that a high vacuum can be created inside the vacuum chamber 146.

A target electrode 150 on which a tin or other metal target 148 is placed is provided in the vacuum chamber 146. This target electrode 150 is connected to a high frequency power supply 154 with a capacitor 152 between. A grounded bond member 16 can also be placed above the target electrode 150. A mixed gas of argon with a small amount of $CF_4$ can also be supplied into the vacuum chamber 146 to produce ions for colliding with target 1418, and to form a fluoride layer 156 on the surface of bond member 16.

In this preferred embodiment of the invention, a metal target 148 and bond member 16 are placed in the vacuum chamber 146, and a high vacuum is created in the vacuum chamber 146. A mixed gas of argon and $CF_4$ is then introduced to the vacuum chamber 146, and a high frequency voltage is applied to target electrode 150 to ionize the argon and generate plasma, thereby causing argon ions to collide with metal target 148 and shed metal atoms. These atoms are then deposited on the surface of the bond member 16 overhead. $CF_4$ is broken down at this time by collision with electrons released by ionization of argon, and the fluorine separated from $CF_4$ bonds with metal adhering to the bond member 16, thus forming a fluoride layer 156.

It should be noted that the bond member 16 on which a fluoride layer 156 has thus been formed can be bonded using any of the methods described above with reference to a bond member 16 of which the surface has been fluorinated where the mated bond member 16 has a fluorinated surface, a fluoride layer 156 formed thereon, or is a bond member 16 that has not been fluorinated or otherwise halogenated.

It should also be noted that while the target is tin in the above-noted preferred embodiment, the present invention shall not be so limited. That is, a variety of other targets, including a fluoride such as tin fluoride, can be alternatively used. In this case it is not necessary to add the fluoride gas to argon. Furthermore, the target can be an alloy such as tin-zinc or tin-silver.

In addition, this preferred embodiment has been described as forming fluoride layer 156 by means of high frequency sputtering, but the invention shall not be so limited. That is, other sputtering methods, including high speed, low temperature sputtering, can be alternatively used.

FIG. 10A shows a typical cross section of a bonding agent according to a further embodiment of the present invention. This bonding agent 160 has a base 162 of tin in a sheet or foil form of a desired shape with a fluoride layer 164 formed over the entire surface. It should be noted that this fluoride layer 164 is formed by means of a fluorination process as described above.

Solid bonding using this bonding agent 160 is accomplished by sandwiching bonding agent 160 between a pair of bond members 16c and 16d as shown in FIG. 10B. These bond members 16c and 16d can be, for example, metal, ceramic, or a semiconductor.

Pressure is then applied to bond members 16c and 16d as per a method of the present invention described above, and preferably heating bond members 16c and 16d and the bonding agent 160 to a temperature below the melting point of the bond members and bonding agent 160, thereby bonding bond members 16c and 16d through this bonding agent 160 intermediary.

It is therefore possible to bond a pair of bond members 16c and 16d without melting the bonding agent 160 and without using flux. As a result, accurate positioning, alignment, and shape control of the bond members 16c and 16d are possible, and the need for a sludge removing process is eliminated.

It will also be obvious that because lead is not used in the bonding agent, associated environmental problems are also avoided.

When bond members 16c and 16d are pressurized using a cylinder 46 as shown in FIG. 10B, an ultrasonic vibrator 168, which is a vibration generating means of the accompanying claims, can be disposed to base 166 on which bond members 16c and 16d are stacked to apply ultrasonic vibration to bond members 16c and 16d.

Applying ultrasonic vibration during the bonding step works to boost the temperature of the bond and thereby shorten the required bonding time, and separate any oxide layer formed on the bond members 16c and 16d by means of vibration-induced friction. As a result, a positive bond can be easily formed while also improving bond strength.

It should be further noted that this method of bonding with the aid of ultrasonic vibration can also be applied to the above-described bonding methods of the present invention in which the bond members are fluorinated.

It will also be obvious to one with ordinary skill in the related art that while this preferred embodiment of the invention has been described using a base 162 of tin, the invention shall not be so limited. This base 162, for example, could be a tin alloy such as an alloy of solder or tin and zinc, or a tin and silver alloy.

Furthermore, when the base 162 is an alloy containing no lead such as tin-zinc or tin-silver, it is also possible by means of the present invention to provide a so-called lead-free bonding agent.

WORKING EXAMPLES

1. First Working Example

In this first working example the bond members are 60-40 solder (60% tin, 40% lead) in sheet form, and a copper sheet 5 mm wide, 20 mm long, and 0.2 mm thick. The surface of the solder was fluorinated using the fluorination process section 12 shown in FIG. 2.

Fluorination of the solder sheet was accomplished by placing the solder in fluorination chamber 53 at room temperature, introducing HF to fluorination chamber 53 to a 1% concentration with 20% relative humidity (RH), and leaving the solder exposed to this environment for 1 minute. The fluorinated solder was then left exposed to air for approximately 1 hour. The fluorinated solder and copper sheet were then placed together, and exposed to heat and pressurize as described above. The effects of heat and pressure on bond strength were then investigated. The results of this investigation are shown in FIG. 11.

Referring to FIG. 11, bonding pressure is shown on the x-axis (in $kgf/mm^2$), the temperature to which the bond members are heated during bonding, that is, the bonding temperature (in degrees C) is shown on the y-axis, and the shear strength of the bond (in kgf) is shown on the z-axis. Bonding time in all cases was 5 minutes. Shear strength was determined by measuring the force required to separate the bond members when force was applied to the bond members parallel to the bonding plane.

As will be known from FIG. 11, bond strength increases as the bonding pressure and bonding temperature rise, and the shear strength of the bond thus increases. It should be noted that the bonding pressure of 0.05 $kgf/mm^2$ shown in FIG. 11 was achieved by simply stacking the solder and copper sheets together, that is, as the effect of gravity alone.

2. Second Working Example

In this second working example, fluorinated 60-40 solder and an untreated copper sheet identical to those used in the first working example above were stacked in air, and the relationship of bond strength to bonding temperature and bonding time was investigated. The results are shown in FIG. 12.

Bonding time (in minutes) is shown on the axis of abscissas in FIG. 12, and the shear strength of the bond (in kgf) is shown on the axis of ordinates. The temperature and pressure shown in FIG. 12 represent bonding temperature and bonding pressure, respectively.

As will be known from FIG. 12, bond strength (shear strength) generally improves as the bonding time increases.

It should be noted that fluorinated solder and an untreated copper sheet were also stacked in air at 25° C. with a bonding pressure of 2.00 $kgf/mm^2$ applied for 90 minutes to attempt bonding without applying heat. The bond strength, that is, shear strength, however was 0, and the fluorinated and untreated copper sheet could not be bonded under these conditions.

3. Third Working Example

The effect of atmosphere on bond strength was investigated in this third working example, and the results are shown in FIG. 13.

In this third working example, fluorinated 60-40 solder and an untreated copper sheet identical to those used in the first working example above were used, heated to and held at 150° C., and then combined and bonded in air and in an inert nitrogen atmosphere. Bonding time was 5 minutes in both cases.

At a natural gravity bonding pressure of 0.05 $kgf/mm^2$, the bond in air had a shear strength (bond strength) of approximately 1 kgf. In nitrogen, however, shear strength was approximately 2 kgf, or twice the bond strength achieved in air.

However, when the bonding pressure was 1 $kgf/mm^2$, the bond in air had a shear strength slightly greater than that achieved in nitrogen.

4. Fourth Working Example

The bond members used in this fourth working example were a copper sheet (5 mm wide, 20 mm long, and 0.2 mm thick) plated with 80-20 solder (80% tin, 20% lead), and a soda glass plate (26 mm wide, 76 mm long, and 1.2 mm thick). Both the plated copper sheet and soda glass were fluorinated by exposure for one minute to 1% HF gas at 20% humidity.

The fluorinated copper sheet and soda glass bond members (also referred to as substrates in the present example) were then placed between a soda glass table 36 and a soda glass press 38 in an apparatus similar to the bonding process section 14 shown in FIG. 1. Pressure of 30 $kgf/cm^2$, though the invention shall not be so limited, was then applied to the substrates, and the bonding chamber 34 was filled with argon at atmospheric pressure. Current was then supplied to the heater 48 to gradually increase the temperature from room temperature (25° C.) to 150° C. over a 15 minute period. This pressure and temperature were then held for 45 minutes, and the bonding process was completed in 60 minutes.

The substrates thus process are strongly bonded, and when forcibly separated, solder marks were left on the glass surface.

It should also be noted that sufficient bond strength was also achieved when the temperature and pressure conditions described above were held for only 5 minutes after heating to 150° C.

The substrates can also be strongly bonded by fluorinating only the copper sheet or only the soda glass, and then bonding under the above-described conditions. In this case, however, it is preferable to fluorinate the soda glass because fluorine easily bonds with tin.

It should be further noted that a good bond was also achieved when the above-described bonding process was applied using as the bond members 80-20 solder and soda glass sheets, and two solder sheets.

It should also be noted that adhesion is particularly improved, and a strong bond can be achieved, by applying pressure to solder because solder is soft. Bonding is also possible as described above using solder with 60% tin.

A good bond was also achieved by fluorinating both solder and a silicon substrate used for semiconductor integrated circuits, and then bonding as described above. The same effects were also achieved by fluorinating only the solder or the silicon substrate.

Note, further, that when a conductive solder and copper are bonded as described above, bonding resistance was less than when solder is melted for bonding. This is because bonding with a method according to the present embodiment is dependent upon an intermetallic alloy layer that is thin compared with solder bonding techniques.

The bonding agent (solder or indium) disposed to the bonding part of a ceramic package bottom was also fluorinated, an electronic component then placed in the package bottom, the package bottom then placed in a vacuum chamber and covered with a package top, and heat and pressure were applied as per the method described above. The package top and bottom were thus successfully bonded, producing a vacuum packaged electronic component. This process can also be performed in air or an inert gas environment when a vacuum package is not required. The package top and bottom can also be bonded by applying only heat or only pressure.

5. Fifth Working Example

The results of using bond members (materials) other than those described in the above embodiments and working examples were also investigated. In this case, various bond member materials were fluorinated to determine whether bonding with various unfluorinated materials is, possible. The results of this investigation are shown in FIG. 14.

The fluorination process conditions were identical to those described in the first working example above. The bonding conditions were: heat the bond members to 150° C., apply a 2 kgf/mm$^2$ bonding pressure, and hold for 5 minutes. An open circle (○) in FIG. 14 indicates a bond was made, (—) indicates the test was not conducted.

As will be known from the results shown in FIG. 14, it is possible by means of the present invention to bond a variety of metal, ceramic, and semiconductor bond members without using a bonding agent and without melting either of the bond members by fluorinating at least one of the selected bond members.

EFFECTS OF THE INVENTION

As will be known from the above description of the present invention, two similar or dissimilar bond members can be bonded without using a bonding agent and without melting either of the bond members by contact between the bond members insofar as the contact surface of at least one bond member contains a halogen. Positioning, alignment, and shape control during the bonding step are thus simple, the shape can be stabilized, and sludge is not produced because flux is not used.

It is also possible to bond bond members with a bonding agent according to the present invention without melting and without using flux because the surface of the bonding agent is rich in active fluorine.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A solid bonding method comprising the steps of:
    providing a first bond member of a first material selected from the group consisting of a metal, semiconductor, ceramic, glass, and alumina;
    providing a second bond member of a second material selected from the group consisting of a metal, semiconductor, ceramic, glass, and alumina;
    halogenating at least one surface of the first bond member by generating a active halogen gas at or near atmospheric pressure;
    contacting the first, bond member and the second bond member at the halogenated surface; and bonding the first and second bond members together.

2. The solid bonding method according to claim 1, wherein said halogenating step comprises a fluorination process, and said fluorination process comprises:
    exposing the first bond member to a mixed gas containing a reactive fluoride gas and water vapor.

3. The solid bonding method according to claim 2, further comprising:
    producing reactive fluoride gas by an electric discharge in a mixed gas containing a fluoride gas and water vapor at or near atmospheric pressure.

4. The solid bonding method according to claim 1, wherein said generating of an active halogen gas vapor comprises a fluorination process, and said fluorination process comprises:
    generating active fluorine by mixing one of a water vapor and an alcohol in a gas containing at least fluoride gas, and
    exposing the first bond member to the active fluorine.

5. The solid bonding method according to claim 4, further including an electric discharge in said halogen gas vapor.

6. The solid bonding method according to claim 3 or 4, wherein the first bond member is placed in a discharge area for said fluorination process.

7. The solid bonding method according to claim 3 or 4, wherein the first bond member is placed outside of a discharge area, and active fluorine generated in the discharge area is conducted to the first bond member for said fluorination process.

8. The solid bonding method according to claim 1, wherein said halogenating step comprises:
    generating active fluorine by irradiating fluoride gas with ultraviolet light, and
    exposing the first bond member to the active fluorine.

9. The solid bonding method according to claim 1, wherein said halogenating step comprises:
   exposing the first bond member to a vapor containing reactive fluoride.

10. The solid bonding method according to any of claims 1, 2, 3, 4, 8 or 9, wherein said bonding step comprises:
   placing the first bond member and the second bond member one on top of the other, and
   heating a bond area to a temperature below the melting point of one of the first bond member and the second bond member.

11. The solid bonding method according to claim 10, wherein said bonding step further comprises:
   applying pressure to increase contact pressure between the first and second bond members.

12. The solid bonding method according to claim 10, wherein said bonding step is performed in an inert gas.

13. The solid bonding method according to claims 10, wherein said bonding step further comprises:
   applying ultrasonic vibration to the first bond member contacting the second bond member.

14. The solid bonding method according to any of claims 1, 2, 3, 4, 8 or 9, wherein said bonding step further comprises:
   applying an electric field to the first bond member contacting the second bond member.

15. The solid bonding method according to any of claims 1, 2, 3, 4, 8 or 9, wherein at least one of the first and second bond members comprises one of tin and a tin alloy.

16. The solid bonding method according to claim 1, wherein the first material is the same as the second material.

17. The solid bonding method according to claim 1, wherein the first material is different from the second material.

18. A solid bonding apparatus comprising:
   a fluorination processor for fluorinating a surface of a first bond member, said fluorination processor including a vapor supply for supplying one of a water vapor and an alcohol vapor for mixing with a reactive fluorine gas at or near atmospheric pressure for generating an active fluorine gas; and
   a bonding processor for contacting and bonding a second bond member to the surface of the first bond member to which fluorine has been added by said flourination processor.

19. The solid bonding apparatus according to claim 18, wherein said fluorination processor further comprises:
   a fluorination chamber in which the first bond member to be fluorinated is placed;
   a fluorination gas supply to supply said reactive fluoride gas to said fluorination chamber.

20. The solid bonding apparatus according to claim 19, wherein said fluorination process or further comprises a discharge unit for generating said reactive fluoride gas by means of an electric discharge in said mixed gas containing fluoride gas and one of an alcohol and water vapor at or near atmospheric pressure.

21. The solid bonding apparatus according to claim 18, wherein said fluorination processor comprises a discharge unit in which the first bond member to be fluorinated is placed for irradiation with active fluorine generated by means of an electric discharge in said mixed gas containing a fluoride gas at or near atmospheric pressure.

22. The solid bonding apparatus according to claim 18, wherein said fluorination processor comprises:
   a fluorination chamber in which the first bond member to be fluorinated is placed: and
   a discharge unit to generate active fluorine by means of an electric discharge said mixed gas containing fluoride gas at or near atmospheric pressure, and to supply active fluorine to said fluorination chamber.

23. The solid bonding apparatus according to claim 18, wherein said fluorination processor comprises:
   a discharge chamber in which the first bond member to be fluorinated is placed; and said active fluorine is generated by means of an electric discharge in said mixed gas containing fluoride gas at or near atmospheric pressure, and sprayed onto the first bond member, and
   a vacuum pump to pump said discharge chamber to substantially a vacuum pressure level.

24. The solid bonding apparatus according to claim 18, wherein said fluorination processor comprises an ultraviolet light source to generate active fluorine by irradiating fluoride gas therewith.

25. The solid bonding apparatus according to claim 18, wherein said fluorination processor comprises:
   a fluorination vapor supply to generate a reactive fluoride vapor; and
   a transport to transport the first bond member to be fluorinated through the fluoride vapor generated by said fluorination vapor supply.

26. The solid bonding apparatus according to any of claims 18 or 19 to 25, wherein said bonding processor comprises a heater to heat a bond area of the first bond member contacting the second bond member to a temperature below the melting point of both the first and second bond members.

27. A conductor bonding method for bonding a first electric conductor with a second electric conductor, comprising the steps of:
   fluorinating at least one surface of the first and second electric conductors by exposing at least one of said first and the second conductor to a mixed gas vapor containing a reactive fluoride gas and water vapor at or near atmospheric pressure; and
   bonding the first and second electric conductors in contact with each other at the fluorinated surface.

28. The conductor bonding method according to claim 27, further comprising the step of:
   electrically discharging in said mixed gas containing a fluoride gas and water vapor at or near atmospheric pressure to produce said reactive fluoride gas.

29. The conductor bonding method according to any of claims 28, 29, wherein at least one of the first conductor and the second conductor is placed in a discharge area for said fluorination step.

30. The conductor bonding method according to any of claims 27, wherein said bonding step comprises:
   placing the first conductor on of the second conductors; and
   heating a bonding area to a temperature below the melting point of both the first and second conductors.

31. The conductor bonding method according to any of claims 27 or 28, wherein said bonding step comprises:
   applying pressure to increase contact pressure between the first and second conductors.

32. The conductor bonding method according to any of claims 27 or 28, wherein said bonding step is performed in an inert gas.

* * * * *

UNITED STATES PATENT AND TRADEMARK OFFICE
CERTIFICATE OF CORRECTION

PATENT NO.    : 6,221,197 B1
DATED         : April 24, 2001
INVENTOR(S)   : Yoshiaki Mori et al.

It is certified that error appears in the above-identified patent and that said Letters Patent is hereby corrected as shown below:

Column 22,
Line 30, delete "," after "first".

Column 24,
Line 49, delete "29".

Signed and Sealed this

Eleventh Day of June, 2002

Attest:

JAMES E. ROGAN
Attesting Officer    Director of the United States Patent and Trademark Office